(12) United States Patent
Chen et al.

(10) Patent No.: US 11,440,694 B2
(45) Date of Patent: Sep. 13, 2022

(54) DEVICE AND METHOD OF TEST TUBE PREPARATION

(71) Applicant: GODEX INTERNATIONAL CO., LTD., New Taipei (TW)

(72) Inventors: Chien-Hua Chen, New Taipei (TW); Feng-Yi Tai, New Taipei (TW)

(*) Notice: Subject to any disclaimer, the term of this patent is extended or adjusted under 35 U.S.C. 154(b) by 108 days.

(21) Appl. No.: 16/706,808

(22) Filed: Dec. 8, 2019

(65) Prior Publication Data

US 2021/0070490 A1    Mar. 11, 2021

(30) Foreign Application Priority Data

Sep. 9, 2019 (TW) .................. 108132465

(51) Int. Cl.
| | |
|---|---|
| *B65C 3/02* | (2006.01) |
| *G01N 35/00* | (2006.01) |
| *B65C 9/46* | (2006.01) |
| *B65C 9/02* | (2006.01) |

(52) U.S. Cl.
CPC .............. *B65C 3/02* (2013.01); *B65C 9/02* (2013.01); *B65C 9/46* (2013.01); *G01N 35/00732* (2013.01); *G01N 2035/00861* (2013.01)

(58) Field of Classification Search
CPC .... B65D 2251/0015; B65D 2251/0093; B65D 41/28; B65D 51/2892; B65C 3/02; B65C 9/02; B65C 9/46; G01N 2035/00861; G01N 35/00732
See application file for complete search history.

(56) References Cited

U.S. PATENT DOCUMENTS

| | | | | |
|---|---|---|---|---|
| 5,893,263 A | * | 4/1999 | Matsumoto | ............... B65C 9/02 156/387 |
| 2006/0286619 A1 | * | 12/2006 | Ricci | ......................... B01L 9/06 435/13 |
| 2010/0312379 A1 | * | 12/2010 | Pedrazzini | ............. G01N 35/04 700/230 |
| 2012/0058010 A1 | * | 3/2012 | Pedrazzini | ............. G01N 35/04 422/63 |
| 2015/0336702 A1 | * | 11/2015 | Hanna | ................... B65C 9/0015 156/367 |
| 2016/0075462 A1 | * | 3/2016 | Kang | ........................ B01L 9/06 156/576 |

* cited by examiner

*Primary Examiner* — Sonya M Sengupta

(57) ABSTRACT

A test tube preparation device uses a labeling device to include a linking module to link a positioning unit, and the positioning unit can be used to place a tube body and finely adjust a position of the tube body relative to the label generating module of the surface treating device to complete the label generation, label conveyance, tube labeling and tube delivery, and provide a preparation device for effectively integrating the label and applying to the tube body before and after the labeling of the tube body, so as to improve the quality of the generation of the tube body and the label. Further, the present invention further provides a test tube preparation method.

18 Claims, 18 Drawing Sheets

DEVICE AND METHOD OF TEST TUBE PREPARATION

BACKGROUND OF THE INVENTION

Field of the Invention

The invention relates to a preparation device and a preparation method thereof, in particular to a test tube preparation device for providing an integrated label and rapidly generating and transferring the same onto a test tube, and a preparation method thereof.

Description of the Related Art

The application of current bar code labeling machines or so-called bar code printers and label printers has become quite popular, including applications in the medical industry, transportation industry, retail industry, logistics and warehousing industry, manufacturing industry, entertainment industry, and service. Industry, government agencies, post offices or express delivery, and many other industries.

Among them, in the medical industry, blood testing is one of the important means for doctors to diagnose diseases or rescue patients. In hospitals, clinics and some medical-related institutions, blood is collected from patients by usage of test tubes. The test tube containing blood is sent to the blood test station.

In general, multiple or different types of test tubes are prepared for different patients or different detection needs of the same patient. For further differentiation and identification, it is usually necessary to stick label/bar code reciting patient information, check items, etc. on the test tube. These labels can be marked (printed) in text and/or barcode form on the label sheet and attached to the tube (or tube body). However, the current machines and equipment are still manually operated by the medical staff in a segmented manner for the aforementioned process. However, in the situation that the test tube needs to frequently take and place the test tube, there is a low work efficiency, and the error of the label misplacement, etc. is prone to occur, even worse, eventually leads to detection errors.

Accordingly, the inventors believe that the above-mentioned defects can be improved, and that the present invention has been submitted with great interest in designing and cooperating with scientific principles, and finally proposes a design that is reasonable in design and effective in improving the above-mentioned defects.

BRIEF SUMMARY OF THE INVENTION

The present invention provides a test tube preparation device and a preparation method thereof, which can effectively improve defects that may be generated in the prior art.

An embodiment of the invention discloses a test tube preparation device, which includes a housing, a labeling device, a surface treating device and a control device. The housing includes a main cabinet and a lateral cabinet wall movably connected to the main cabinet. The labeling device is disposed in the main cabinet, wherein the labeling device includes: a linking module including a main frame and a linking unit disposed in the main frame, wherein the linking unit includes a following frame movable with respect to the main frame; and a positioning unit disposed on the following frame for receiving a tube body and providing fine adjustment of a position of the tube body opposite to the surface treating device. The surface treating device includes a label generating module and a paper supply module configured to supply paper for the label generating module, wherein the label generating module conveys the generated paper to the labeling device. The control device is configured to control the labeling device and the surface treating device, wherein the positioning unit finely adjusts the position of the tube body to move the tube body to approach or depart from the label generating module, whereby the tube body is labeled and conveyed.

An embodiment of the present invention also discloses a method for preparing a test tube utilizing the aforementioned test tube preparation device. The method includes the following steps: a generating step: the label generating module of the surface treating device receives an instruction and data, and receives the paper from the supply module, and the data is set on an adhesive paper of the paper; a conveying step: a paper feed roller of the label generating module is used to convey the generated adhesive paper (i.e., the label) to the labeling device; a labeling step: feeding the tube body to the accommodating space of the labeling device and feeding the tube body to the positioning unit, the control device controlling the following frame of the linking module to finely adjust the displacement of the positioning unit, and finely adjusting the tube body to be close to the label generating module, so that the generated adhesive paper is adhered to the tube body.

In summary, the test tube preparation device disclosed in the embodiment of the present invention uses a labeling device including a linking module to link the positioning unit, and the positioning unit can place a tube body and finely adjust a position of the tube body relative to the surface treating device. The structural design and configuration relationship of the label generating module approaching or departing from the label to complete the label generation, label conveyance, tube labeling and tube delivery, and provide an effective integration of the label to be quickly generated and transferred to the tube body before and after the tube body labeling process. The preparation equipment is used to improve the quality of the tube and the label and to quickly adhere the label, thereby improving the practical efficiency.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
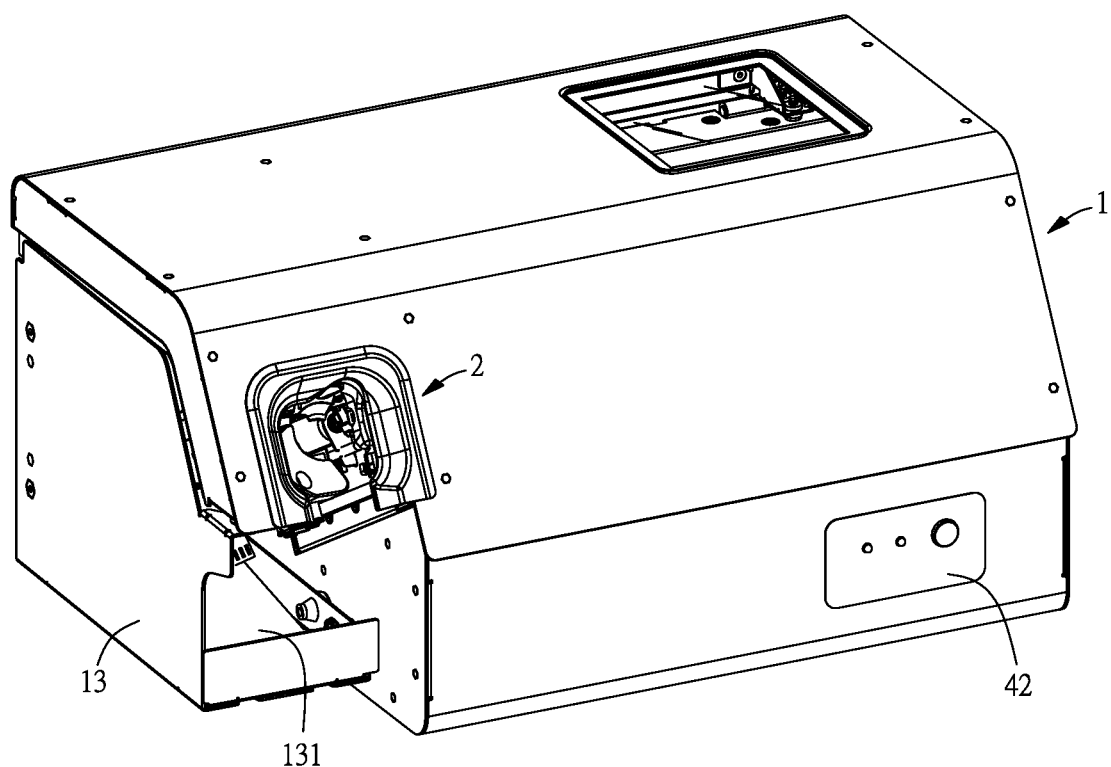
FIG. 1 is a perspective view of an embodiment of a test tube preparation device of the invention.

The following description is of the best-contemplated mode of carrying out the invention. This description is made for the purpose of illustrating the general principles of the invention and should not be taken in a limiting sense. The scope of the invention is best determined by reference to the appended claims.

Referring to FIG. 1 to FIG. 16, which are embodiments of the present invention. It should be noted that the related quantity and appearance mentioned in the embodiment are only used to specifically describe the present embodiment. The embodiments of the invention are not used to limit the scope of the invention.

Test Tube Preparation Equipment

Referring to FIG. 1 to FIG. 15, which is an embodiment of the present invention. The embodiment of the present invention discloses a test tube preparation device 100, which includes a housing 1, a labeling device 2 pivoted to the housing 1, a surface treating device 3 disposed near the labeling device 2, and a control device 4 disposed in the housing 1 configured to synchronously control the labeling device 2 and the surface treating device 3.

It should be noted that the test tube preparation device 100 of the present embodiment is described by a labeling device 2 and a surface treating device 3 with the aforementioned corresponding components. However, the present invention does not limit the structural composition of the surface treating device 3 and its connection relationship with the corresponding elements described above. That is, in other embodiments not shown in the present invention, a label generating module 31 of the surface treating device 3 may be related to the specific disclosure disclosed below, or may directly apply an existing printer to generate a label paper (that is, the adhesive paper 811' which has been generated as shown below) of the invention, and convey the adhesive paper 811' to the labeling device 2 for labeling operation. Further, the housing 1, the labeling device 2, and the control device 4 may be cooperated with a surface treating device with a configuration different from that of the surface treating device 3 of the present embodiment.

Figure 2:
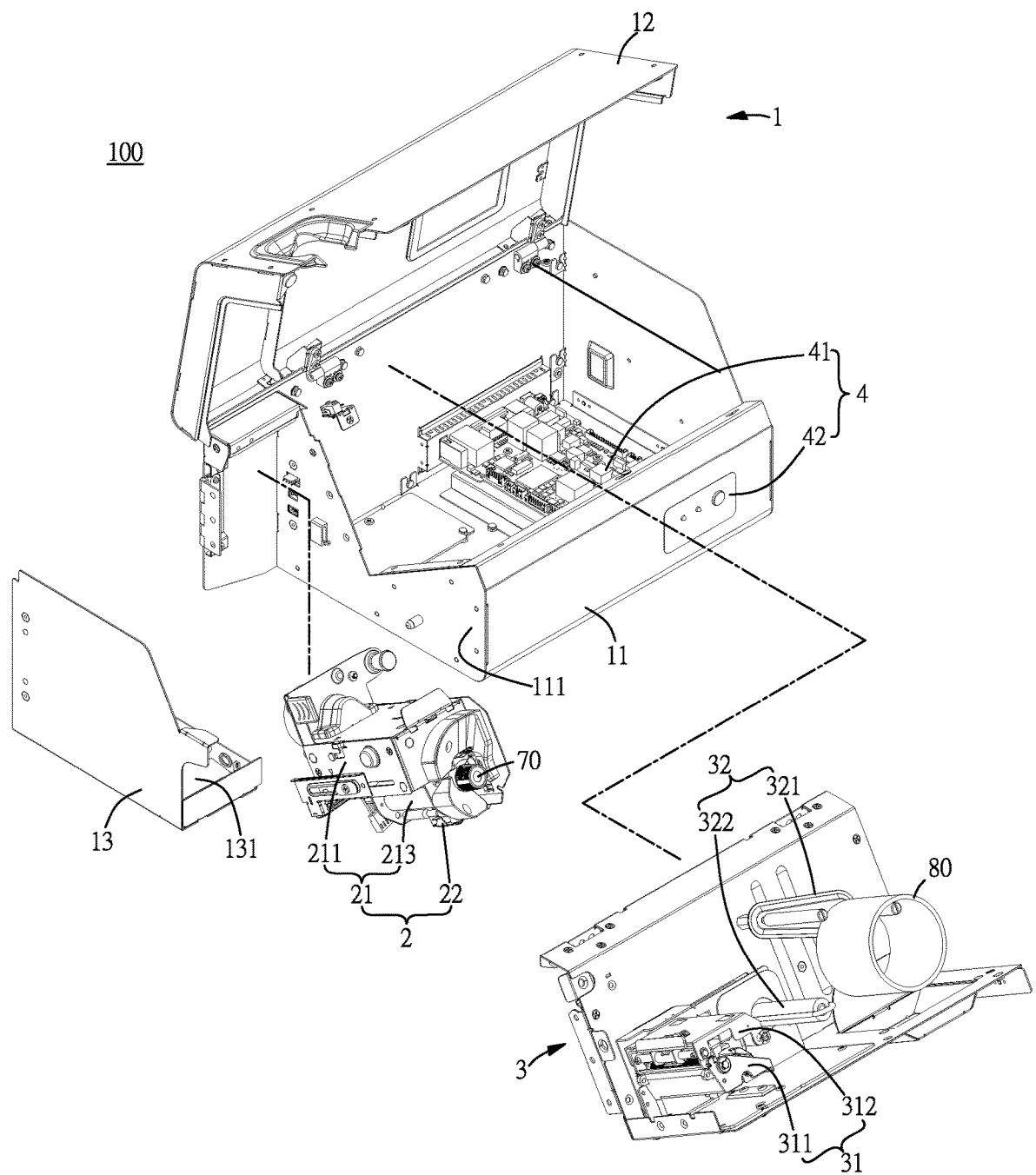
FIG. 2 is an exploded view of an embodiment of a test tube preparation device of the invention.
Figure 3:
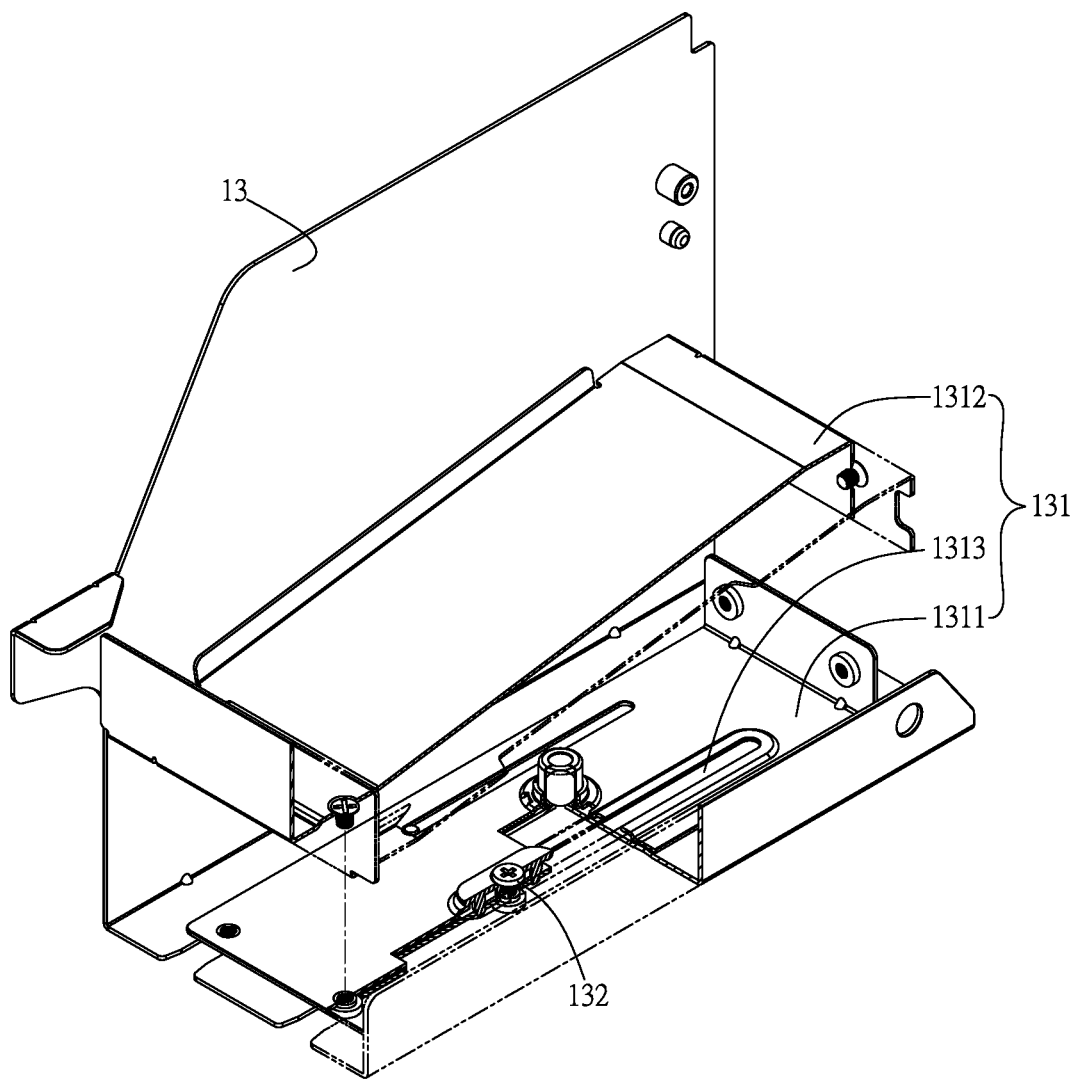
FIG. 3 is an exploded view of a lateral cabinet wall and an accommodating unit of FIG. 2.

Referring to FIGS. 1, 2 and 3, the housing 1 includes a main cabinet 11, an upper cover 12 movably connected to the main housing 11, and a lateral cabinet wall 13 movably connected to a side of the main cabinet 11, which facilitates the opening or the closing of the lateral shell wall 13 relative to the main cabinet 11. Furthermore, a mounting wall 111 is mounted inside the main casing 11 and protrudes therefrom.

As shown in FIG. 2 and FIG. 3, in the embodiment, the lateral cabinet wall 13 is substantially L-shaped, and an accommodating unit 131 is disposed on a transverse surface. The accommodating unit 131 includes a sliding plate 1311 disposed on the transverse surface and an accommodating substrate 1312 stacked and fixed to the sliding plate 1311. An elongated slot 1313 is defined on the sliding plate 1311, and the sliding plate 1311 is positioned on the transverse surface and slidable forwards and backwards by a screw passing through the elongated slot 1313.

Referring to FIGS. 4A, 5, 6, 7A, 8, and 9 cooperating with FIGS. 10 to 14, the labeling device 2 is movably disposed in the housing 1, and the labeling device 2 includes a linking module 21 and a positioning unit 22. The linking module 21 includes a main frame 211 and a linking unit disposed in the main frame 211, and the linking unit includes an active roller unit 212 and a following roller unit 213. Hereinafter, each element of the labeling device 2 and its mutual positional relationship will be described.

Figure 4A:
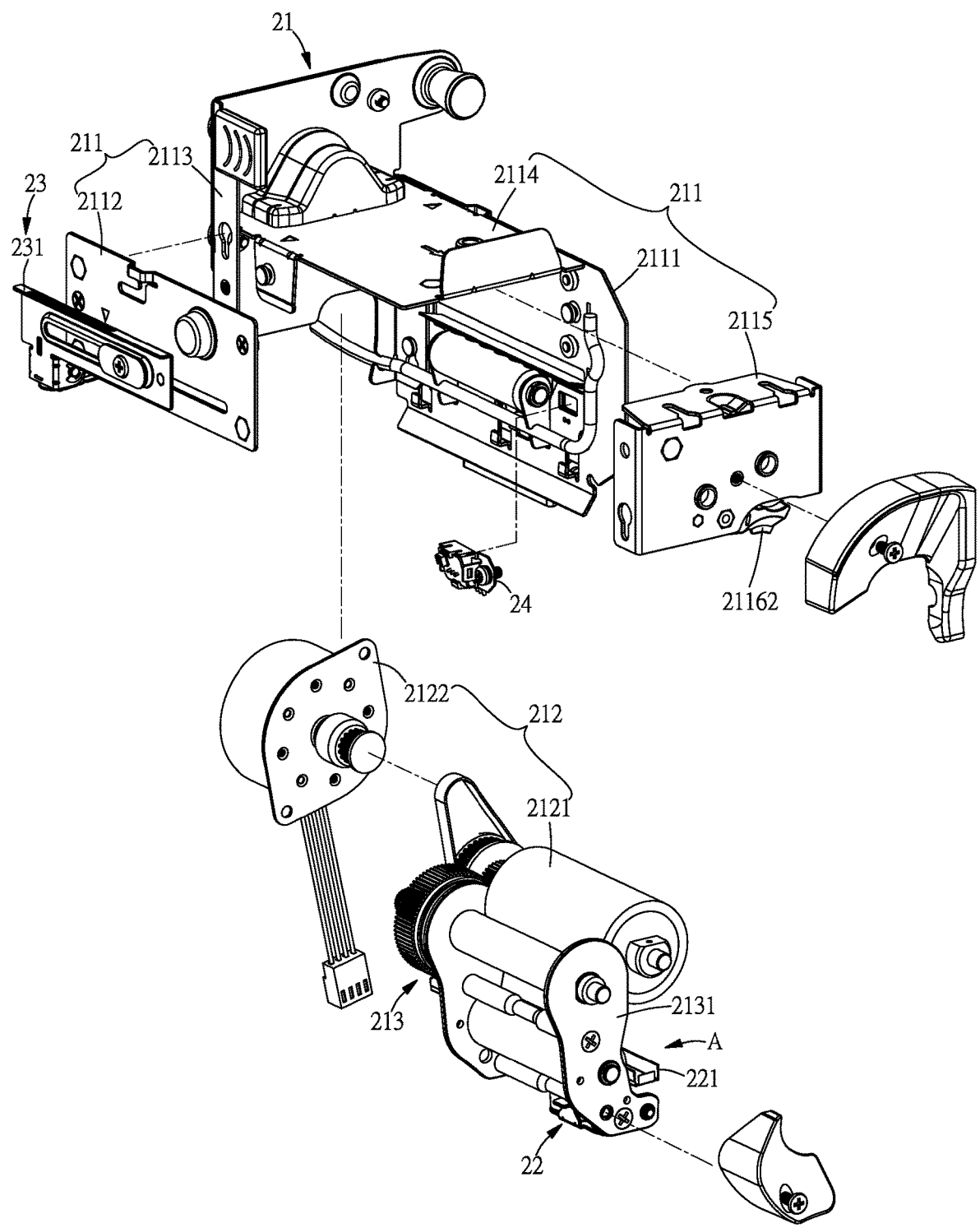
FIG. 4A is an exploded view of a labeling device of FIG. 2.
Figure 5:
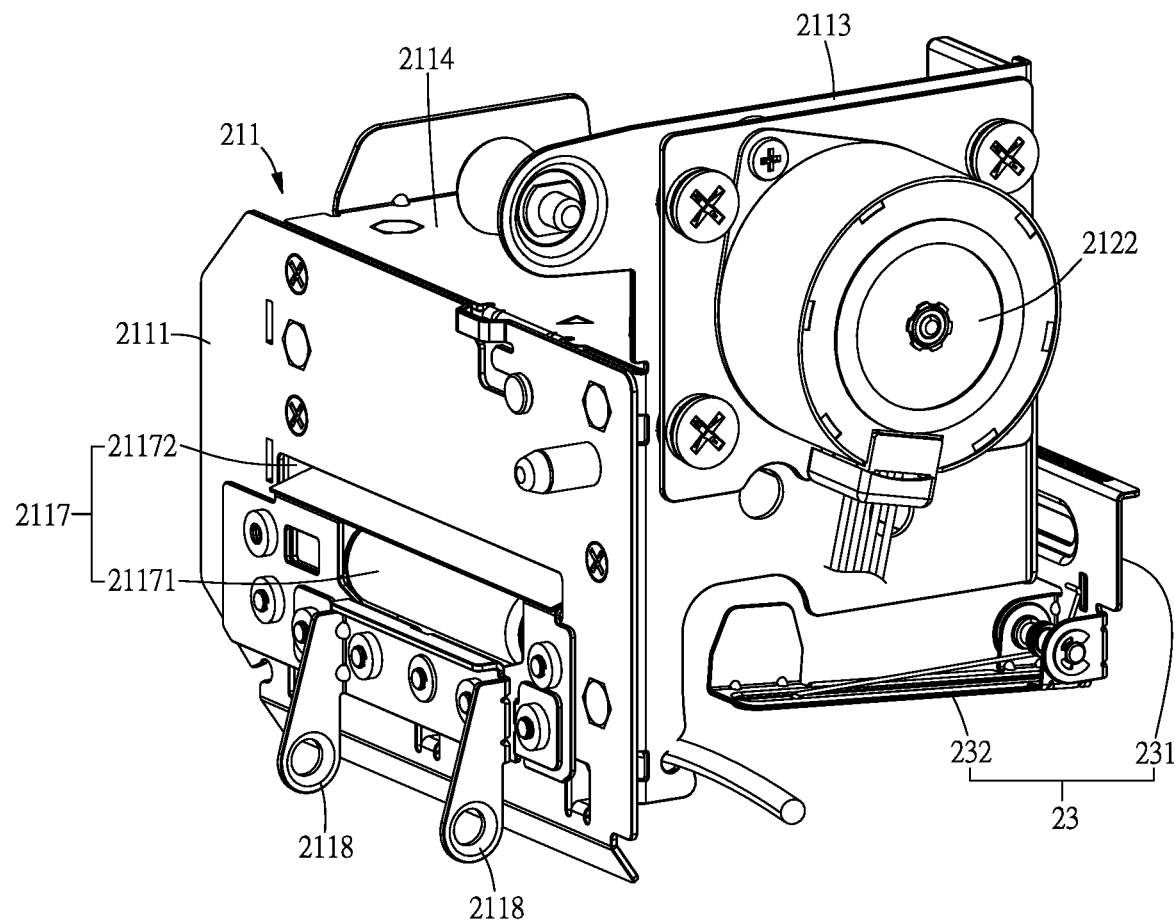
FIG. 5 is a schematic view from another view angle of a first lateral frame wall of FIG. 4.
Figure 9:
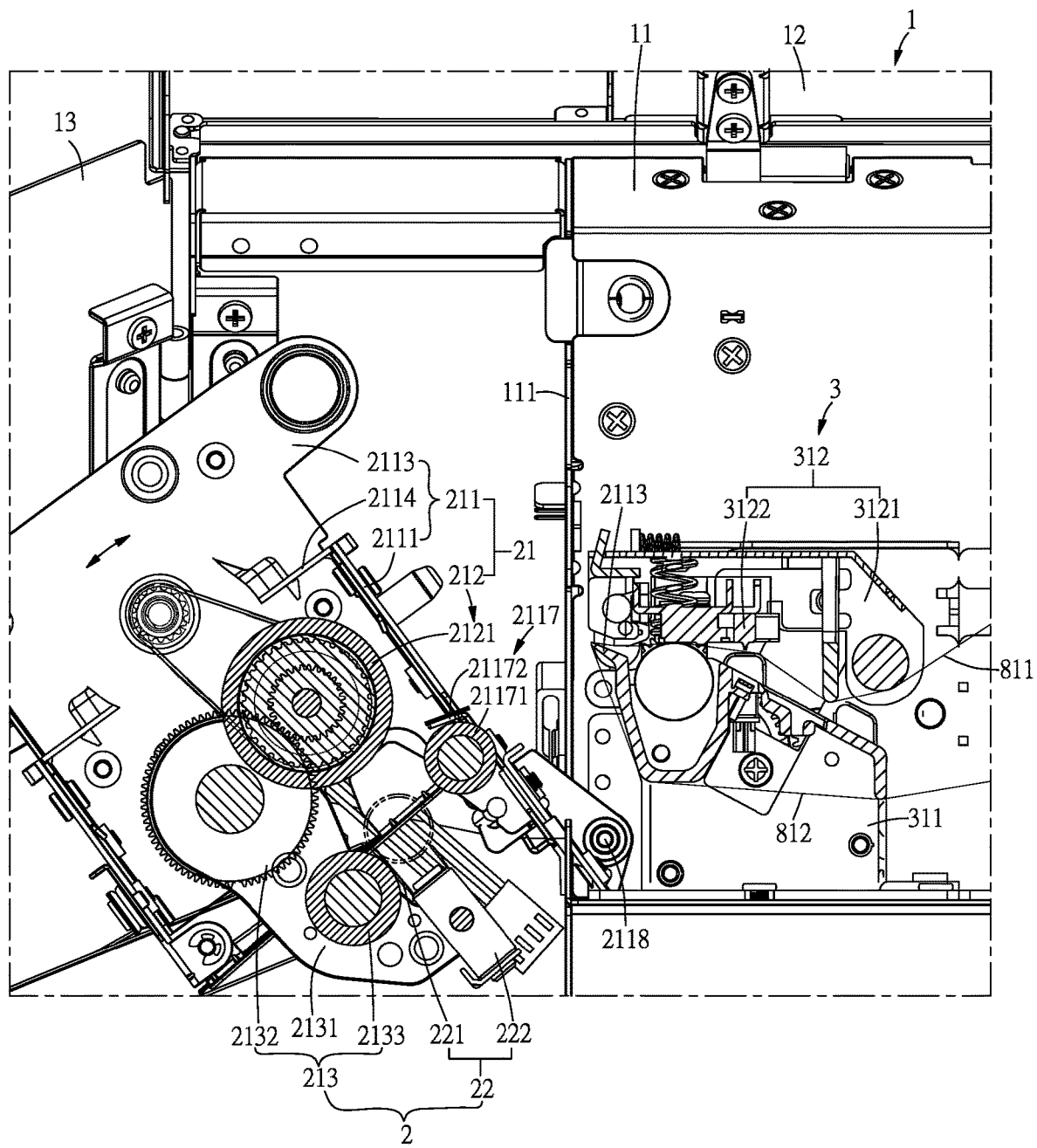
FIG. 9 is a schematic view of a labeling device rotated to left side relative to the housing of FIG. 2.

As shown in FIGS. 4A and 9, in the present embodiment, the main frame 211 includes a first lateral frame wall 2111, a second lateral frame wall 2112, a rear lateral frame wall 2113 connecting the first and second lateral frame walls 2111 and 2112, a top lateral frame wall 2114 disposed at the top side, and a front lateral frame wall 2115 disposed at the front side. As shown in FIGS. 2 and 5, a pivoting portion 2118 is disposed below the first lateral frame wall 2111 of the main frame 211 for pivoting the main frame 211 to the mounting wall 111 in the main cabinet 11 of the housing 1 so that the main frame 211 can be pivoted outward relative to the mounting wall 111 of the main cabinet 11 (FIG. 9) when the lateral cabinet wall 13 is opened.

Figure 7A:
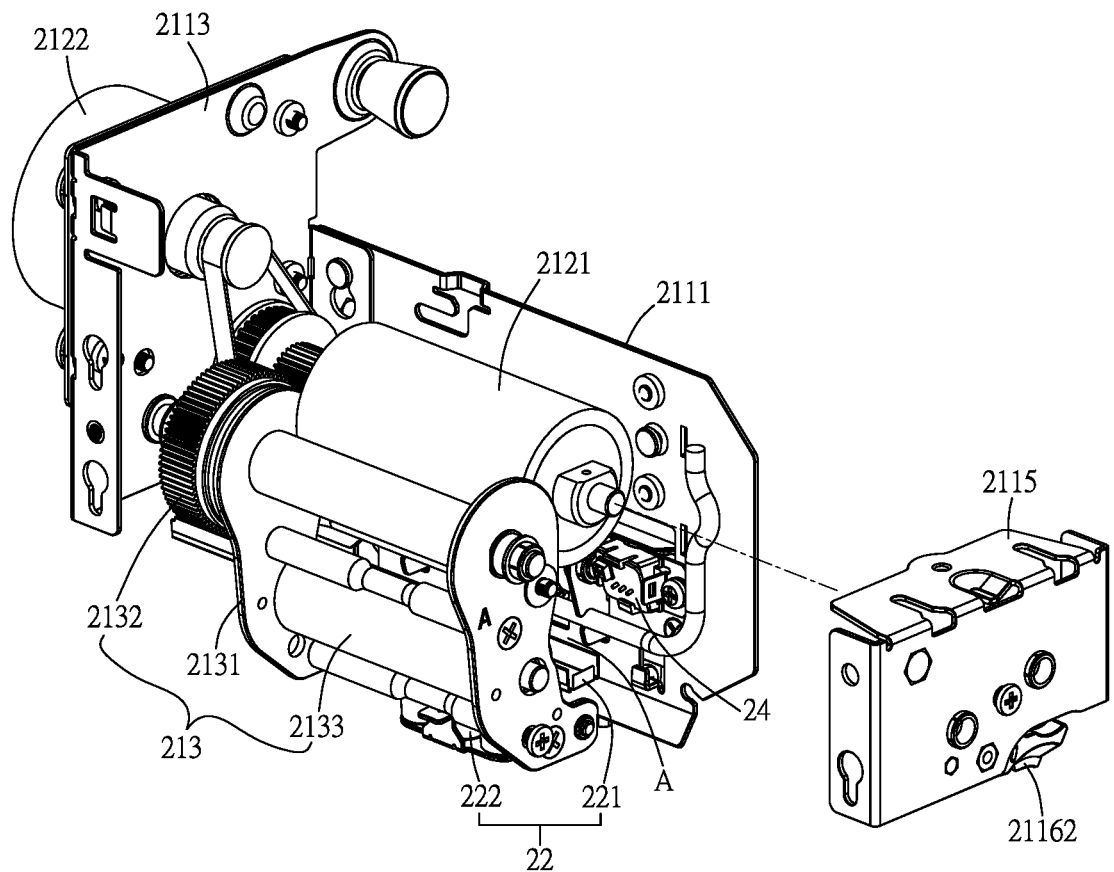
FIG. 7A is partially exploded view of a linking unit and a positioning unit of FIG. 4A.
Figure 7B:
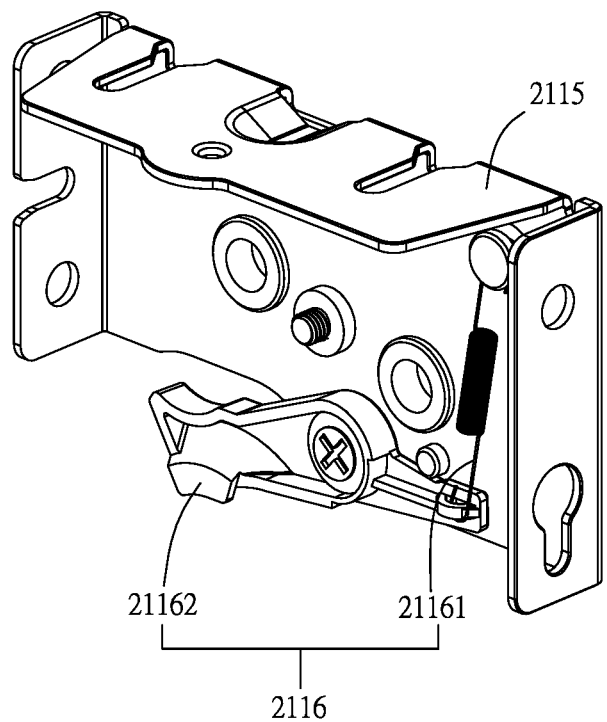
FIG. 7B is a schematic view from another view angle of a position limiting module of FIG. 7A.
Figure 8:
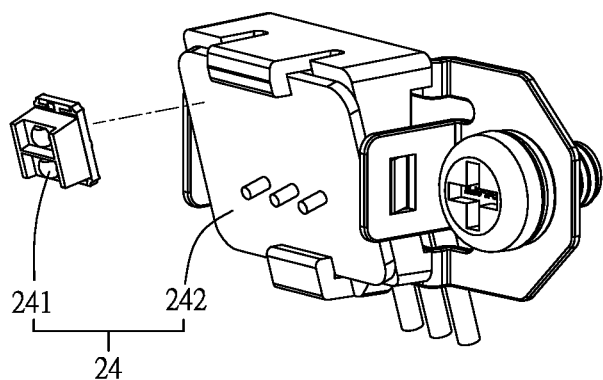
FIG. 8 is an exploded view of the position limiting module of FIG. 4A.

Further, as shown in FIGS. 4A, 5, 7A, and 7B, a biasing/guiding unit 2116 is disposed on an inner surface of the front lateral frame wall 2115 of the main frame 211. In the embodiment, the biasing/guiding unit 2116 includes an elastic member 21161 and a biasing member 21162 connected at one end to the elastic member 21161, so that a free arm of the biasing member 21162 is inclined down to the right side (as shown in FIGS. 7, 7A). Moreover, as shown in FIG. 5, an auxiliary unit 2117 is disposed on the first lateral frame wall 2111 of the main frame 211. In the embodiment, the auxiliary unit 2117 includes a rotational roller 21171 controlled by the control device 4 to be capable of rotating clockwise, and an opening 21172 with a guiding piece formed above the rotational roller 21171, and the auxiliary unit 2117 is located slightly lower than the position of the biasing/guiding unit 2116, so that the free arm of the biasing member 21162 of the biasing/guiding unit 2116 corresponds exactly to the auxiliary unit 2117 and the positioning unit 22, and an end edge of the free arm of the biasing member 21162 is slightly higher than the opening 21172 of the auxiliary unit 2117.

Based on the structural positional relationship of the biasing/guiding unit 2116 and the auxiliary unit 2117, the opening 21172 is adapted to allow the passage of the generated adhesive paper 811' of the paper 81 conveyed by the surface treating apparatus 3 to enter the main frame 211. The front end edge of the generated adhesive paper 811' in the main frame 211 can be guided and pressed down by the free arm of the biasing member 21162 of the biasing/guiding unit 2116, thereby approaching the positioning unit 22 (see FIG. 12).

Figure 6:
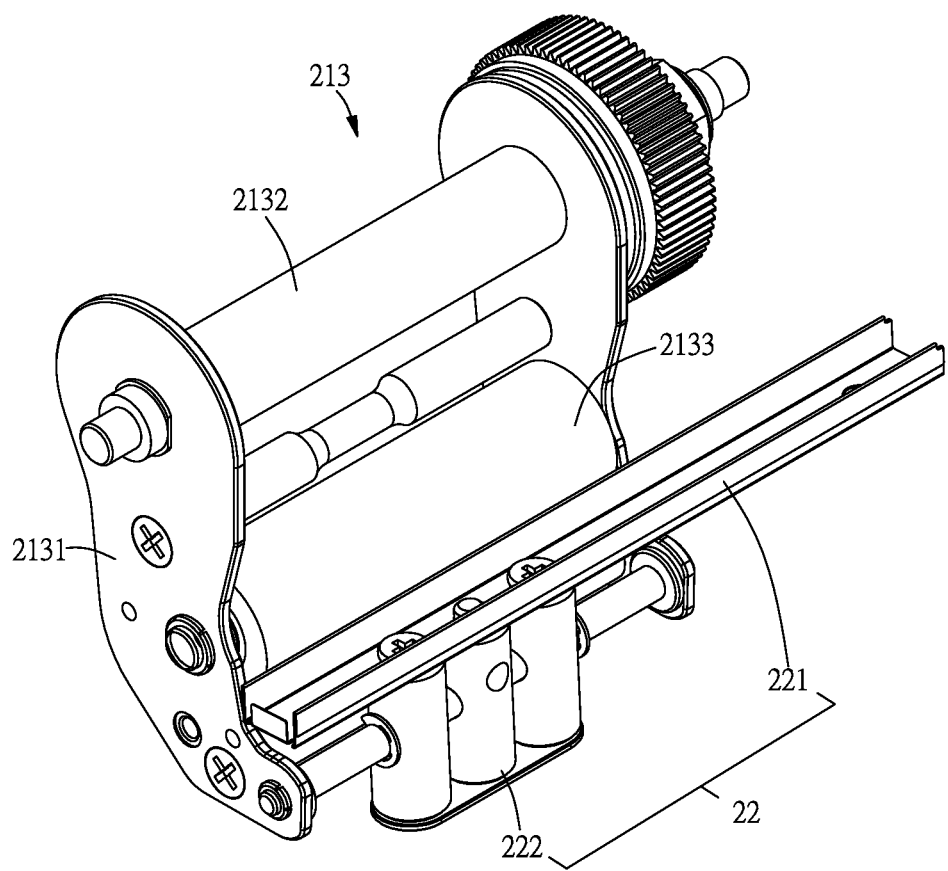
FIG. 6 is a perspective view from another view angle of a linking unit and a positioning unit of FIG. 4A.

As shown in FIG. 4A, in the present embodiment, the active roller unit 212 includes an active roller 2121 and a power portion 2122 that can be linked to the active roller 2121. The two sides of the active roller 2121 are pivoted to the rear lateral frame wall 2113 and the front lateral frame wall 2115 respectively. The power unit 2122 is disposed on the rear lateral frame wall 2113. In addition, as shown in FIGS. 4A, 6, and 7A, the active roller unit 213 includes a following frame 2131, a first following roller 2132 and a second following roller 2133 mounted on the following frame 2131, and the first following roller 2132 is shafted on the upper end edge of the following frame 2131 and located above the second following roller 2133, wherein the first following roller 2132 can be driven by the active roller 2121 so as to drive a lower end edge of the following frame 2131 to be laterally rotated. Thus, the lower end edge of the follower frame 2131 can be moved to approach or depart from the first lateral frame wall 2111 of the main frame 211 (see FIGS. 4A and 7A).

Referring to FIGS. 4A, 6, and 7A, the positioning unit 22 of the labeling device 2 is disposed on the lower end edge of the follower frame 2131 and away from the first following roller 2132. The positioning unit 22 includes a test tube rack 221 that can carry a tube body 70, and a counter weight member 222 that connects the tube rack 221, wherein both ends of the counter weight member 222 are pivotally disposed at the lower end edge of the following frame 2131 and away from the first following roller 2132. When the first following roller 2132 is released, the following frame 2131 can return to its original position by the counter weight member 222 (in the present embodiment, the "return to its original position" refers to returning to a first position P1 away from the first lateral frame wall 2111 as exemplarily shown in FIG. 11). In other words, when the first following roller 2132 is driven by the active roller 2121 to drive the lower end edge of the following frame 2131 to rotate laterally, the positioning unit 22 on the lower edge of the following frame 2131 is laterally moved, thereby finely adjusting the distance between the positioning unit 22 and the auxiliary unit 2117 (in the present embodiment, the fine adjustment of distance includes the shortening of the distance and the moving back to the original position as shown in FIG. 12).

Figure 10:
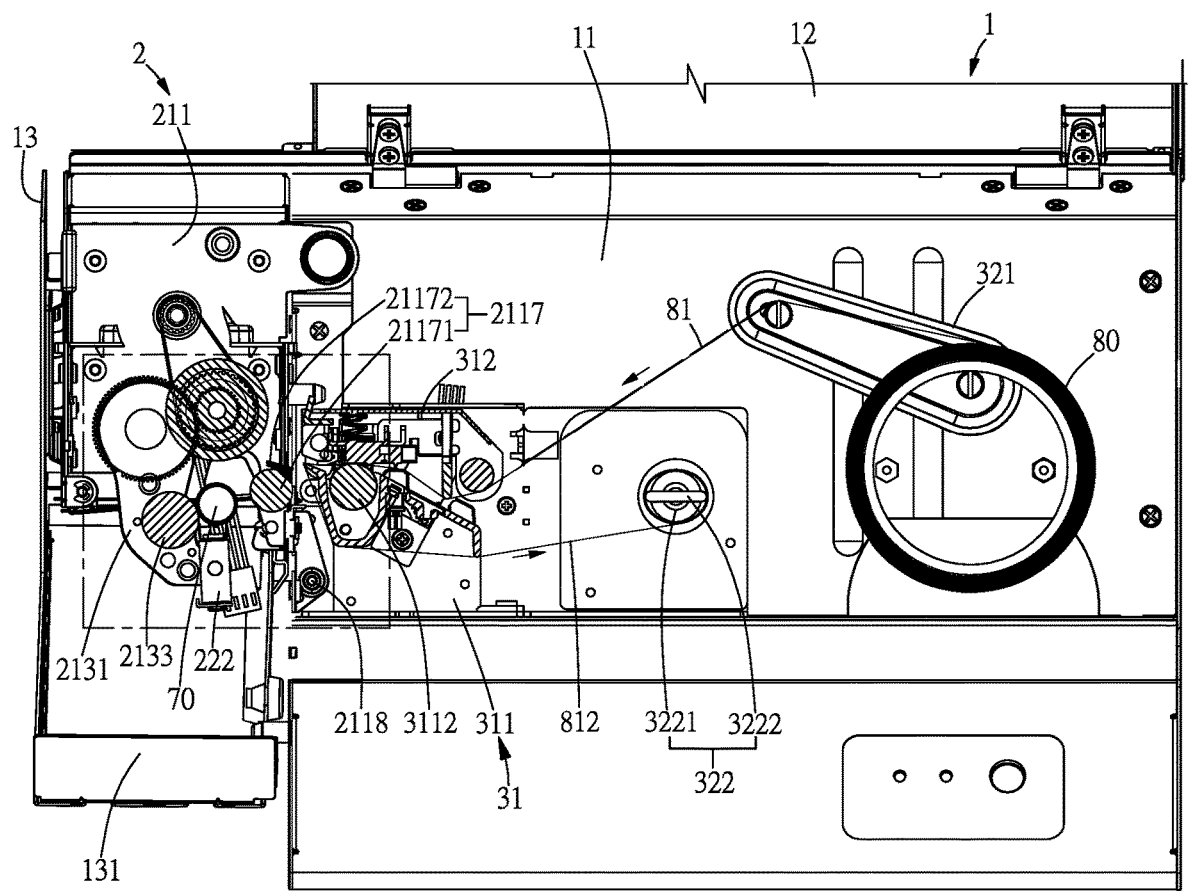
FIG. 10 is a cross sectional view of the test tube preparation device of the invention.
Figure 11:
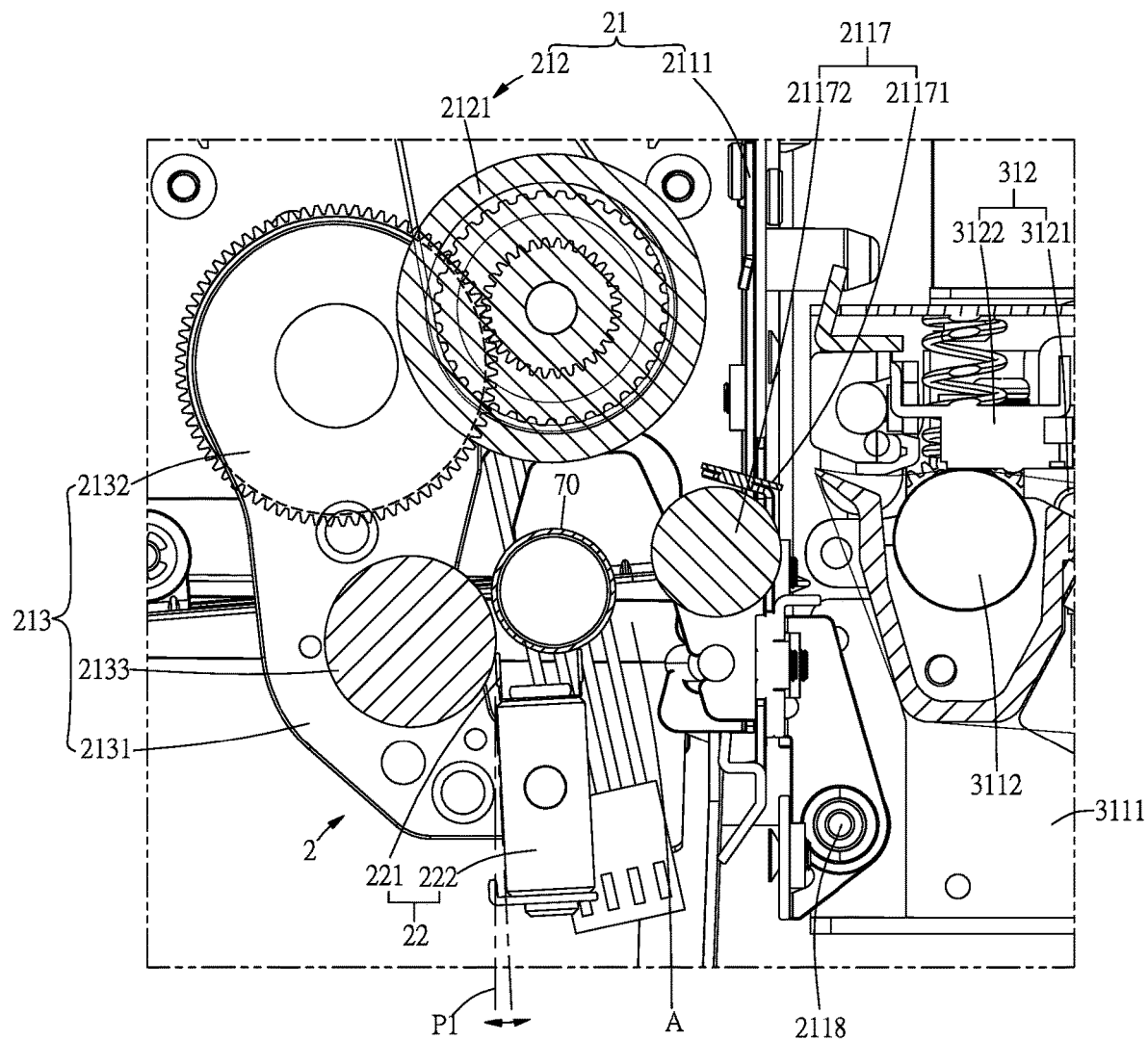
FIG. 11 is a cross sectional view of a labeling device and label generating module.

Referring to FIGS. 2, 4A, 10, 11, based on the aforementioned components, structures, mutual positional relationship and the combination thereof, the labeling device 2 is pivoted to the mounting wall 111 in the main cabinet 11 of the housing 1 through the pivoting portion 2118 below the first lateral frame wall 2111 of the main frame 211 so that the first lateral frame wall 2111 props against a lateral surface of the mounting wall 111. the labeling device 2 is disposed on the first lateral frame wall 2111 through the auxiliary unit 2117 so that the opposite sides of the auxiliary unit 2117 corresponds respectively to the positioning unit 22 and the surface treating device 3, and an accommodating space A is formed between the following frame 2131 and the auxiliary unit 2117 so that the positioning unit 22 is located in the accommodating space A, and located in the first position P1 (in the present embodiment, the first position P1 is the original position, as shown in FIG. 11). Accordingly, the positioning unit 22 is at a distance away from the auxiliary unit 2117, that is, the test tube rack 221 and the rotational roller 21171 are apart from each other. In addition, as shown in FIG. 10, when the lateral cabinet wall 13 of the housing 1 is closed to cover a lateral side of the main cabinet 11, the accommodating unit 131 disposed on the lateral cabinet wall 13 is located below the labeling device 2 and corresponds to the positioning unit 22.

Figure 12:
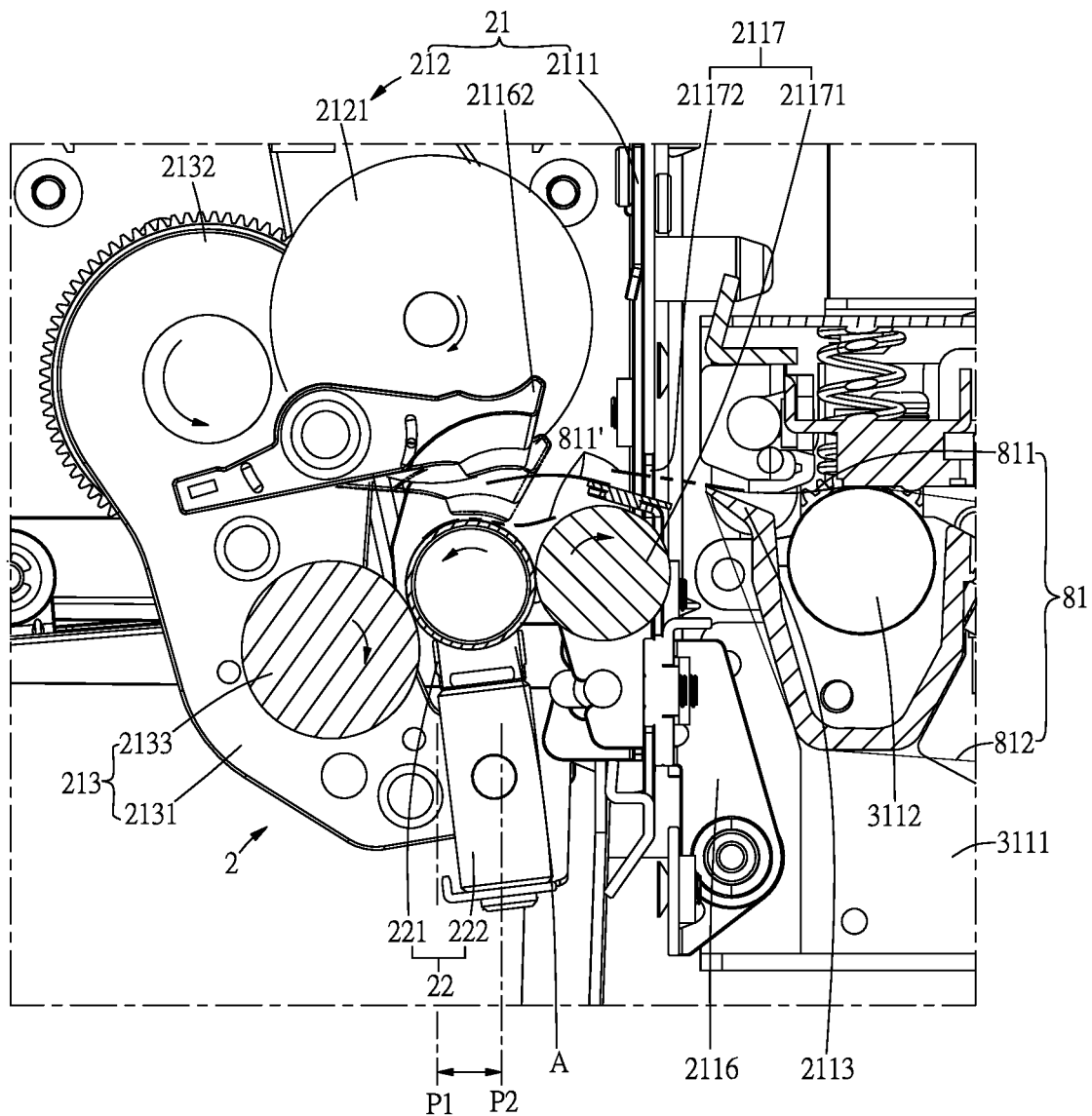
FIG. 12 is a schematic view of operation of FIG. 11.
Figure 13:
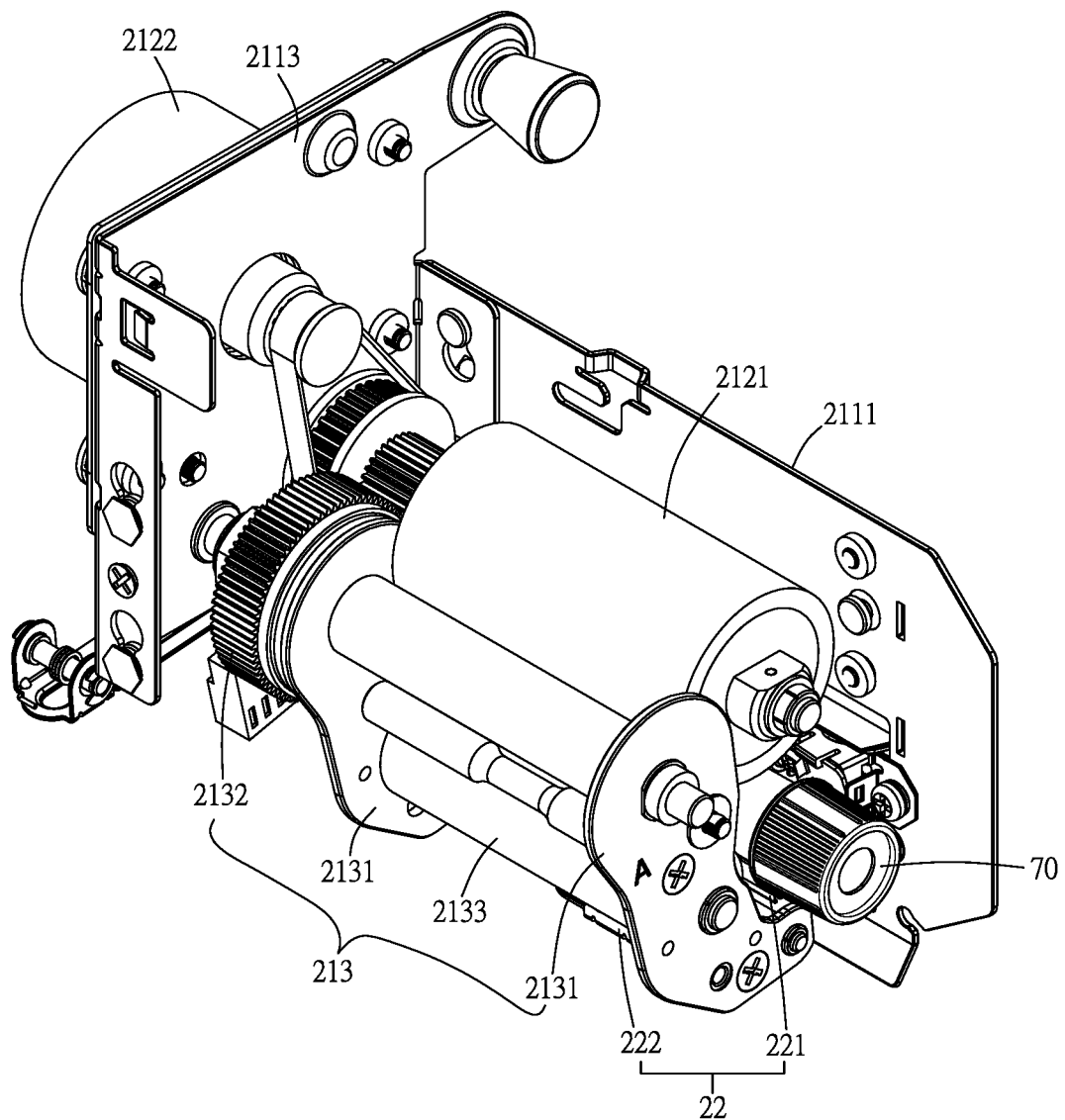
FIG. 13 is a perspective view of a labeling device with a tube body (the position relationship of a following frame, a test tube rack, a tube body, a biasing/guiding unit)
Figure 14:
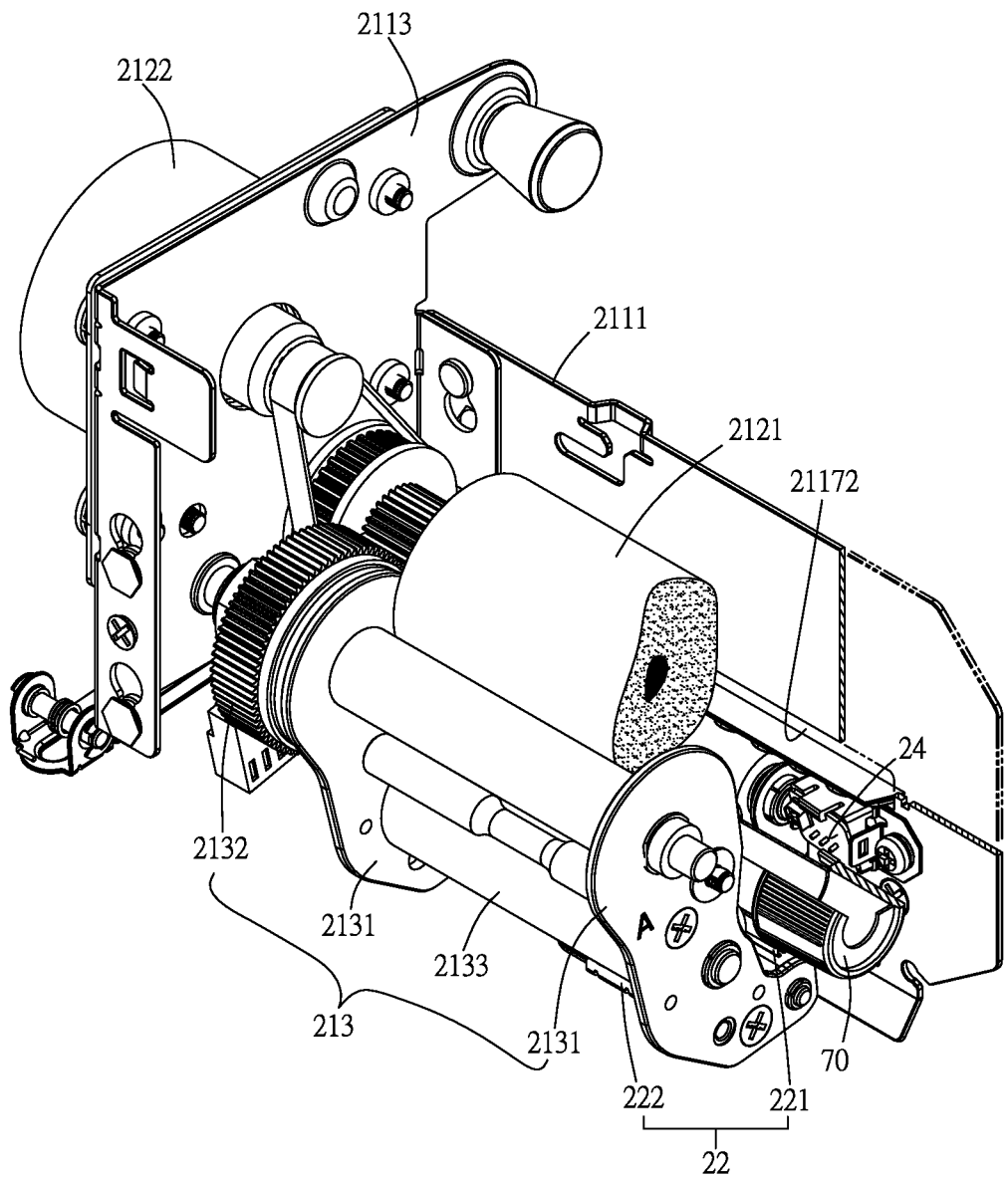
FIG. 14 is a partially exploded view of FIG. 13 (the position relationship of the tube body and the auxiliary unit)
Figure 15:
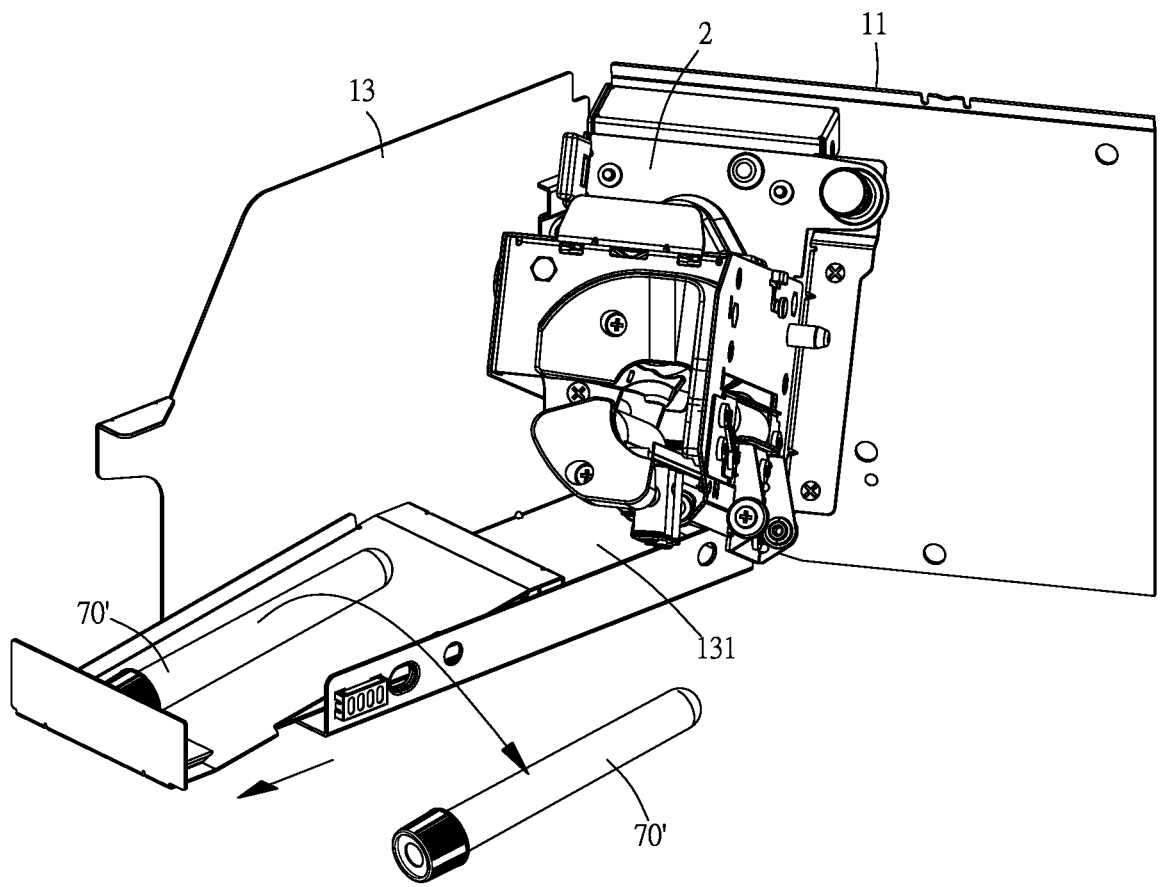
FIG. 15 is a schematic view of the tube body labeling and falling into the accommodating unit.

Thereby, in the form of use, as shown in FIGS. 11, 12, 13, the active roller 2121 of the linking module 21 can be linked to the first following roller 2132 to rotate the following frame 2131 axially, and the following frame 2131 can be linked to the positioning unit 22, thereby finely adjusting the distance between the positioning unit 22 on the following frame 2131 with respect to the auxiliary unit 2117. That is, as shown in FIGS. 12 and 13, when the active roller 2121 is driven by the power portion 2122 to rotate clockwise, the first following roller 2132 is meshed to rotate counterclockwise. Because the first following roller 2132 is located at a top of the following frame 2131, the lower free end edge of the following frame 2131 is rotated counterclockwise, and the positioning unit 22 is offset from the first position P1 in an upper right direction to a second position P2, thereby finely adjusting the positioning unit 22 to approach the auxiliary unit 2117. That is, the test tube rack 221 is finely adjusted to approach the rotational roller 21171. At this time, the free arm of the biasing member 21162 of the biasing/guiding unit 2116 is pressed downward, and is thus close to the positioning unit 22 (as shown in FIG. 12).

In more detail, as shown in FIGS. 12 and 13, when the tube body 70 is correspondingly placed on the test tube rack 221 of the positioning unit 22, and the left side of the tube body 70 props against the second following roller 2133, the test tube rack 221 approaches the rotational roller 21171 through the aforementioned fine adjustment so that the right side of the tube body 70 to prop against the rotational roller 21171 which rotates clockwise (at this time, even if the left and right sides of the tube body 70 prop respectively against the second following roller 2133 and the rotational roller 21171 and located on the test tube rack 221 to approach the surface treating device 3).

Based on this, the right side of the tube body 70 props against the rotational roller 21171 which rotates clockwise so that the tube body 70 is rotated counterclockwise, and the rotating tube body drives the second following roller 2133 to rotate clockwise. Further, based on the positional relationship between the biasing/guiding unit 2116 and the auxiliary unit 2117, when the adhesive paper 811' of the paper 81 is conveyed by the surface treating device 3 to enter the main frame body 211 via the opening 21172, the leading edge of the adhesive paper 811' in the forward direction can be guided and pressed by the free arm of the biasing member 21162 of the biasing/guiding unit 2116, and can be smoothly adhered to the tube body 70 rotating counterclockwise in the test tube rack 221 of the positioning unit 22 so as to accomplish the tube labeling operation.

On the contrary, as shown in FIGS. 11 and 12, when the tubular body of the tube body 70' is labeled, the active roller 2121 releases the linking relationship with the first following roller 2132, the counter weight member 222 of the positioning unit 22 quickly returns the following frame 2131 (in the present embodiment, the phrase "return" means the rapid movement from the second position P2 to the first position P1). Furthermore, when the lateral cabinet wall 13 of the housing 1 is closed to cover a side of the main cabinet 11, the lateral cabinet wall 13 is located below the positioning unit 22 through the accommodating unit 131 on the lateral cabinet wall 13, whereby the returned positioning unit 22 on the following frame 2131 is quickly moved to the left position P1 from the second position P2. Even if the tube body 70' in the test tube rack 221 is dropped right down, the tube body 70' can be received by the accommodating unit 131, whereby automatic reception of the labeled tube body 70' is accomplished.

Furthermore, the top lateral frame wall 2114 of the main frame 211 can be designed as a separable structure. That is, in a normal condition, the top lateral frame wall 2114 is directly covered on a space surrounded by the first and second lateral frame walls 2111 and 2112, the rear lateral frame wall 2113 and the front lateral frame wall 2115 of the main frame 211 to protect the modules and components in the main frame 211. On the contrary, when the top side frame wall 2114 is opened according to requirements, the modules and components in the main frame body 211 can be conveniently inspected or repaired.

Figure 4B:
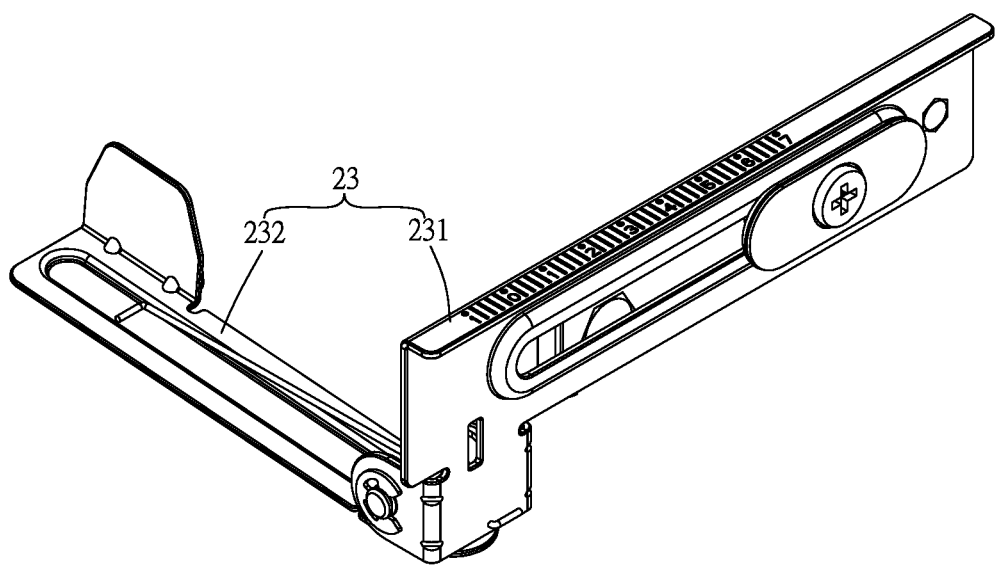
FIG. 4B is a perspective view of a calibrating unit of FIG. 4A.

Further, as shown in FIGS. 4A, 4B and 5, the labeling device 2 further includes a calibrating unit 23 disposed on the second lateral frame wall 2112 of the main frame 211. The calibrating unit 23 includes a guiding member 231 disposed on the second lateral frame wall 2112 and a push member 232 connected to the guiding member 231. The guiding member 231 defines a sliding slot. A locking member passes through the sliding slot to position the guiding member 231 on the second lateral frame wall 2112, whereby the guiding member 231 is horizontally displaceable relative to the second side frame wall 2112. The push member 232 is located just above the test tube rack 221 of the positioning unit 22. Accordingly, when the guiding member 231 is horizontally displaced relative to the second lateral frame wall 2112 through the fine adjustment, the push member 232 is moved forwards and backwards so as to finely adjust the position of the tube body 70 on the test tube rack 221 so that the position of the tube body 70 in the test tube rack 221 is effectively corrected. Furthermore, as shown in FIGS. 2, 4A, 5, and 13, the push member 232 can be finely adjusted so that the tube body 70 is located on the test tube rack 221, and the tube cap portion is mostly protruded from the main frame 211, which is convenient for the operator to recognize the presence of the tube body 70 merely at a glance.

Furthermore, as shown in FIGS. 4A, 7A, 8, 13, and 14, the labeling device 2 further includes a position limiting module 24, and the position limiting module 24 is disposed on the first lateral frame wall 2111 of the main frame 211, and opposite to the positioning unit 22. The position limiting module 24 includes an inductive receiver 241 for detecting the position of the tube body 70 on the positioning unit 22, and an edge detecting unit 242 for detecting and aligning the tube body 70. In the present embodiment, the edge detecting unit 242 includes a plurality of retractable contact posts arranged in a row, and the inductive receiver 241 and the edge detecting unit 242 are connected to each other and electrically connected to the control device 4. Accordingly, the inductive receiver 241 is used to detect the tube body 70, receive a mutual alignment message from the edge detecting unit 242 corresponding to a predetermined adhering edge point (not shown) on the tube body 70, and transmit the information to the control device 4. Therefore, the detection and alignment operations are accomplished to improve the quality of the labeling.

In the embodiment, the labeling device 2 further includes a recognizing module (not shown) disposed on the first side wall 2111, and the recognizing module is connected to the control device 4. The recognizing module generally includes a scanning unit and an identification unit for scanning and identifying whether the tube body 70 is correctly labeled, and transmitting the labeling information to the control device 4 for more effectively control the labeling quality. However, the present invention is not limited thereto, that is, as understood by those skilled in the art, the aforementioned embodiments are merely illustrative of the spirit of the present invention and the effects thereof, and are not intended to limit the protection of the present invention.

Referring to FIGS. 2, 4A, 10 and 11, the surface treating device 3 is located in the vicinity of the labeling device 2 and includes a label generating module 31 and a paper supply module 32 that provides paper 81 to the label generating module 31. The label generating module 31 and the paper supply module 32 can be disposed in the main cabinet 11 of the housing 1, and the label generating module 31 is relatively close to the labeling device 2 so that the label generating module 31 fed the paper with a generated label to the labeling device 2. Therefore, the generation and transmitting operations are accomplished. However, the invention is not limited thereto.

It should be noted that, in this embodiment, a label generating module 31 of the surface treating device 3 may be applied by the specific structure disclosed as follows, or may be directly applied by a conventional printer. The aforementioned other devices and modules are illustrative of the embodiments of the present invention and the achievable effects thereof, so as to better understand the present invention and not to limit the scope of the present invention.

That is to say, the aforementioned mark printing method used for the present invention utilizes the label generating module 31 of the surface treating apparatus 3 which can receive instructions from a data device (not shown) and the data of patient/personal association to be generated (the data device generally includes the identification of the patient and associated personal data and biometric data of the patient), the association step is accomplished, and the label generating module 31 can receive the paper 81 provided by the paper supply module 32. The paper 81 includes a plurality of adhesive papers 811 and a back paper 812 on which the adhesive papers 811 are disposed. Accordingly, the label generating module 31 generates the data on the adhesive paper 811 of the paper 81. The labeling and the generating operation are accomplished. The adhesive paper 811' on which the label has been generated (i.e. the label paper) is transferred to the labeling device 2 to complete the transfer step so as to facilitate the labeling operation of the labeling device 2. Next, the specific structure and the positional relationship between the respective elements of the surface treating device 3 will be described later.

Referring to FIGS. 2, 10, and 11, in the present embodiment, the label generating module 31 of the surface treating device 3 is disposed in the main cabinet 11 of the housing 1 and has a side close to the other side of the mounting wall 111. The label generating module 31 includes a base unit 311, a printing head unit 312 movably disposed above the base unit 311, and a transceiving unit (not shown) connected to the printing head unit 312. The transceiving unit is configured to receive the associated data/message from the data device and transfer the associated data/message to the printing head unit 312 for data label printing.

The base unit 311 includes a base 3111, a paper feed roller 3112 disposed on the base 3111, and a peeling unit (not shown). The print head unit 312 includes a carbon ribbon holder 3121 having a thermal induction ribbon and a printing head 3122 disposed at a front end of the ribbon holder 3121, so that the printing head 3122 corresponds to the paper feed roller 3112 below the printing head 3122, and the rear side of the ribbon holder 3121 is pivoted to the base 3111 of the base unit 311 to facilitate the opening and closing of the ribbon holder 3121 over the base 3111. Accordingly, when the ribbon holder 311 is opened, the base unit 311 and the printing head 3122 can be easily inspected for trouble shooting and maintenance.

Referring to FIGS. 2, 10 to 13, the paper supply module 32 of the surface treating device 3 is disposed on the upright inner surface of the main cabinet 11 of the housing 1 and located on another side of the label generating module 31. The paper supply module 32 includes a paper roll holder 321 and a collecting unit 322, wherein the paper roll holder 321 is used to mount a paper roll 80 having the paper 81 to facilitate the supply of the paper 81 to the printing head unit 312 of the label generating module 31 to generate data (i.e. label printing), whereby the generating operation is accomplished. The back paper 812 of the generated paper 81' can be peeled off by the peeling unit. The paper feed roller 3112 conveys the adhesive paper 811' (which is a label paper with label printing) to the auxiliary unit 2117 of the labeling device 2, and the generated adhesive paper 811' is passed through the opening 21172 of the auxiliary unit 2117 and continuously transferred to the positioning unit 22. The transfer operation is accomplished to facilitate the subsequent labeling operation performed by the labeling device 2 for the tube body 70. In addition, the collecting unit 322 of the paper supply module 32 (including a collecting shaft 3221 that can clamp the back paper 812 and a stop member 3222 that can position the collecting shaft 3221) is used to collect the back paper 812 left by the paper 81.

Thereby, according to the structural relationship between the surface treating device 3 and the labeling device 2, as shown in FIGS. 10, 11, 12, 13, the free arm of the biasing member 21162 of the biasing/guiding unit 2116 of the labeling device 2, the opening 21172 of the auxiliary unit 2117, and the paper feeding roller 3112 of the base unit 311 of the label generating module 31 are configured to form a paper feeding path for smoothly feeding the generated adhesive paper 811' conveyed by the paper feed roller 3112 to pass through the opening 21172 of the auxiliary unit 2117, and then the adhesive paper 811' is guided by the biasing member 21162 of the biasing/guiding unit 2116 and pressed down to be attached to the tube body 70. At this time, the tube body 70 is rotated counterclockwise on the positioning unit 22, so that the generated adhesive paper 811' can be smoothly adhered to the surface of the rotating tube body 70, thereby accomplishing the labeling operation for the tube body.

Furthermore, when labeling operation of the tube body 70' on the test tube rack 221 is completed, the first following roller 2132 is uncoupled by the active roller 2121, and the counter weight member 222 of the positioning unit 22 can rapidly move the following frame 2131 to the first position P1 from the second position P2. Even if the tube body 70' is dropped out of the test tube rack 221 after the labeling, the tube body 70' can be received by the accommodating unit 131 so as to automatically receive the labeled tube body 70'. In this way, the label generation and transfer performed by the label generation module 31 and the labeling and conveying of the tube body 70 performed by the labeling device 2 of the present invention are accomplished.

In particular, the label generating module 31 of the surface treating device 3 can also utilize the conventional printers. As can be understood by those skilled in the art, in order to better understand the spirit of the present invention, the applicant of the present invention only provides the following implementation instructions, but will not repeat them. That is to say, the label generating module 31 uses the conventional printers to print the data associated with the plurality of patients on each of the adhesive paper 811 of the paper 81 generated on a paper roll 80 one by one in advance. Each adhesive paper 811 of the paper roll 80 is placed on the paper roll holder 321 of the paper supply module 32. The paper 81' of the paper roll 80 is received by the paper feed roller 3112 of the base unit 311, and the back paper 812 is peeled off by the peeling unit, and the paper feed roller 3112 conveys the generated adhesive paper 811' to the labeling device 2, whereby the correlating step, the generating step, and the conveying step are performed to facilitate the labeling operation and the conveying operation. Therefore, the label generation, label transferring, label adhesion and tube body conveying can also be accomplished. The collecting unit 322 can be used to collect the back paper 812 of the paper 81.

Referring to FIGS. 1 and 2, the control device 4 is configured to synchronously control the labeling device 2 and the surface treating device 3. The positioning unit 22 finely adjusts the position of the tube body 70 to move the tube body 70 approaching or departing the label generating module 31 relative to the label generating module 31 so as to complete label generation, label transfer, and tube 70 labeling and delivery.

That is, the control device 4 is electrically connected to a power source (not shown), and includes a software unit (not shown), a circuit unit 41 connected to the software unit, and a display unit 42 disposed on the housing 1. The display unit 42 is configured to display the condition of the corresponding elements of the labeling device 2 and the surface treating device 3.

[Preparation Method]

Figure 16:
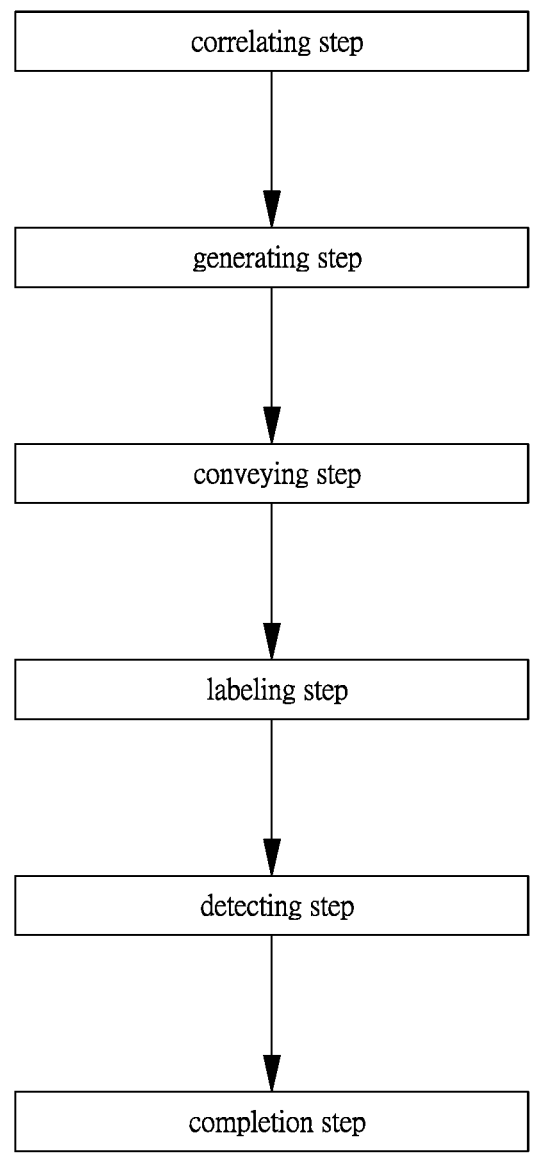
FIG. 16 is a flow chart of an embodiment of a test tube preparation method of the invention.

Referring to FIG. 16, the present embodiment also discloses a preparation method which is implemented by using the aforementioned tube preparation apparatus 100, but the present invention is not limited thereto.

The preparation method of the present embodiment includes: a correlating step, a generating step, a conveying step, a labeling step, a detecting step, and a completion step.

The correlating step: providing the test tube preparation device 100 as described above, turning on a power source, and the test tube preparation device 100 is connected to the data device before the test tube preparation device 100 is used for the tube label preparation and the tube body is used to collect the biological product to be analyzed (for example, blood). The data device first identifies the patient's identity and correlates the patient's relevant personal data and biometric data to correctly correlate the patient data. The specific configuration of the test tube preparation device 100 has been disclosed above, and will not be repeatedly described herein. In addition, in other embodiments not shown in the present invention, the label generating module 31 may be replaced by other members and modules in the test tube preparation device 100 for the preparation method.

The generating step: providing the instructions from the data device and the data correlated to the patient to be generated by the label generating module 31 of the surface treating device 3 as shown in FIGS. 10 and 11, and receiving the paper 81 from the paper feed module 32. The paper 81 is supplied to the printing head unit 312 of the label generating module 31 for printing so as to form the data on the adhesive paper 811 of the paper 81 (as shown in FIG. 11). According to this, the generated paper sheet 81' can be received and conveyed by the paper feed roller 3112 of the base unit 311. Therefore the label generation operation is accomplished.

According to the embodiment of the aforementioned generating step, as shown in FIGS. 1, 2, and 10, the label generating module 31 of the surface treating device 3 and the paper supply module 32 are provided in the housing 1. In an embodiment, the label generating module 31 is adjacent to the other side of the mounting wall 111 and opposite to the labeling device 2 as described above to facilitate the supply of the paper 81 from the paper supply module 32 to the printing head unit 312 of the label generating module 31 for printing, and generate the data on the adhesive paper 811 of the paper 81.

According to the embodiment of the aforementioned generating step, the printing head unit 312 of the label generating module 31 of the surface treating device 3 described above may be additionally provided outside the housing 1 in another different embodiment. That is to say, the paper supply module 32 is opposite to the base unit 311, and the printing head unit 312 of the label generating module 31 can utilize the conventional printers, and only needs to print the data correlated to a plurality of patients on each of the adhesive paper 811' of the paper 81' generated on a paper roll 80 in advance. The paper roll 80 is placed on the paper roll holder 321 of the paper supply module 32. Further, according to this, it is also possible to receive the generated paper 81' by the paper feed roller 3112 of the base unit 311.

The conveying step is provided as shown in FIGS. 10, 11, and 12. The paper feed roller 3112 of the base unit 311 of the label generating module 31 receives the generated paper 81' and continuously conveys the paper 81'. During the conveyance, the back paper 812 is peeled off by the peeling unit, the adhesive paper 811' (i.e. the label paper) is conveyed to the labeling device 2 by the paper feed roller 3112, and the collecting unit 322 is used to collect the back paper 812 of the generated paper 81' of the generated paper roll 80.

According to the embodiment of the aforementioned conveying step, as shown in FIG. 12, the generated adhesive paper 811' continuously conveyed toward the labeling device 2 can pass through the opening 21172 of the auxiliary unit 2117 and enter the main frame 211. The generated adhesive paper 811' is guided and pressed down by the free arm of the biasing member 21162 of the biasing/guiding unit 2116 which is inclined to the right side, so that one end of the generated adhesive paper 811' (the front end in FIGS. 10 and 12) continues to be moved toward the tube body 70 on the positioning unit 22 (as shown in FIG. 12, at this time, the positioning unit 22 is located at the second position P2). Therefore, the correct conveyance operation is accomplished.

The labeling step is provided as shown in FIGS. 2, 12, and 13. The tube body 70 is thrown into the accommodating space A of the labeling device 2, fed to the positioning unit 22 and located in the test tube rack 221. The control device 4 controls the power portion 2122 of the linking module 21 to drive the active roller 2121, and the active roller 2121 drives the first following roller 2132 so as to rotate the following frame 2131 axially. The following frame 2131 can move the positioning unit 22 from the first position P1 to the second position P2 (as shown in FIGS. 11 and 12), so that the positioning unit 22 on the following frame 2131 is finely adjusted to approach the auxiliary unit 2117.

According to the embodiment of the labeling step, as shown in FIGS. 11, 12 and 13, when the active roller 2121 is driven by the power portion 2122 to rotate clockwise, the first following roller 2132 is driven to rotate counterclockwise. Because the first following roller 2132 is located at the upper end of the following frame 2131, the lower free end edge of the following frame 2131 is rotated counterclockwise so as to finely adjust the positioning unit 22 to be moved from the first position P1 "upper right" to the second position P2. Therefore, the position of the positioning unit 22 is closer to the auxiliary unit 2117, that is, the right side of the test tube rack 221 is closer to the rotational roller 21171, and the upper side of the test tube rack 221 is closer to the free arm of the biasing member 21162 of the biasing/guiding unit 2116. Through the aforementioned fine adjustment operation, the left and right sides of the tube body 70 located on the test tube rack 221 props against the second following roller 2133 and the rotational roller 21171, respectively, and are closer to the surface treating device 3 (as shown in FIG. 12).

According to the embodiment of the labeling step, as shown in FIG. 12, the right side of the tube body 70 props against the rotational roller 21171 and is rotated counterclockwise by the rotational roller 21171 (the rotational roller rotates clockwise). At this time, the tube body is driving the second following roller 2133 to rotate clockwise during the rotation. According to the embodiment of the aforementioned conveying step, the front end edge of the generated adhesive paper 811' which enters the main frame body 211 and continues to be conveyed forward can be smoothly guided and press down by the biasing member 21162 of the biasing/guiding unit 2116, and can be smoothly adhered to the surface of the tube body 70 in a counterclockwise direction. Therefore, a correct labeling operation is accomplished.

The detecting step is provided as shown in FIGS. 4A, 7A, 13, and 14. According to the embodiment of the labeling step, the inductive receiver 241 of the position limiting module 24 of the labeling device 2 can be used to identify whether the tube body 70 is located on the test tube rack 221 of the positioning unit 22, and the edge detecting unit 242 finds and aligns the position of the adhesive edge of the tube body 70 through the plurality of retractable contact posts to accomplish the correct labeling operation and thereby improve the labeling quality. Accordingly, the inductive receiver 241 is used to detect the position of the tube body 70 and receive alignment information from the edge detecting unit 242 and an edge point for adhesion (not shown) on the tube body 70 to facilitate the alignment and labeling operation of the tube body. The labeling operation transmits information to the control device 4, and the display unit 42 displays whether the operation condition of the corresponding component of the labeling device 2 and the surface treating device 3 is normal so as to accomplish the effective control.

The completion step: according to the embodiment of the labeling step, when the tube body 70' is labeled, the linking unit of the labeling device 2 is controlled by the control device 4 to release the linking relationship temporarily (that is, the power portion 2122 controlling the linking unit controls the active roller 2121 to release the interlocking relationship with the first following roller 2132 temporarily) so that the positioning unit 22 above the following frame 2131 makes the following frame 2131 and the test tube rack 221 rapidly return to their original position through the counter weight member 222, quickly moved toward left to the first position P1 from the second position P2. In this way, not only the positioning unit 22 returns to the first position P1, but it moves away from the auxiliary unit 2117. At this time, the returning movement causes the labeled tube body 70' to fall downward from the test tube rack 221 into the accommodating unit 131 on the inner surface of the lateral cabinet wall 13 so as to accomplish the automatic accommodation of the labeled tube body 70'.

Technical Effect of the Embodiment of the Present Invention

In summary, the test tube preparation device 100 disclosed in the embodiment of the present invention includes the labeling device 2 which includes the linking module 21 drives the positioning unit 22. The position of the tube body 70 is finely adjusted to be closed to or away from the label generation module 31 of the surface treating device 3 through the positioning unit 22 to complete label generation, label conveyance, tube body labeling and tube body delivery. The test tube preparation device 100 of the present invention is an integrated equipment for the process before and after labeling of the tube body, which effectively integrates the devices of quick label generation, label conveyance and label adhesion to the tube body so as to improve the excellent label generation and label adhesion to the tube body and the label, thereby improving the practical efficiency.

The test tube preparation device 100 disclosed in the embodiment of the present invention provides an integrated preparation device which provides the continuous operation of rapidity and convenience. The work efficiency is high. The inductive receiver 241 of the position limiting module 24 is used to detect the tube body 70 and receive a adhering edge point on the tube body 70 detected by the edge detecting unit 242 so as to achieve effective edge detecting, improve the alignment and corrected the label adhesion. The accommodating unit 131 on the inner surface of the lateral cabinet wall 13 can accommodate the labeled tube body 70', thereby greatly improving the quality of the test tube preparation and accomplishing the automatic accommodation of the tube body after labeling. It can solve the shortcomings of manual segmental operation, low efficiency, and easy misplacement of labels.

Further, in the test tube preparation device 100 disclosed in the embodiment of the present invention, when the lateral cabinet wall 13 and the upper cover 12 are opened, the main frame 211 can be outwardly rotated with respect to the mounting wall 111 of the main cabinet 11. It is advantageous for the surface treating device 3 to facilitate the installation of paper, the maintenance and other inspection operations. In addition, the top lateral frame wall 2114 of the main frame 211 is designed as a separable structure. When the top lateral frame wall 2114 is opened according to requirements, the modules and components in the main frame body 211 can be inspected or repaired. Accordingly, the usage effect of the present invention is greatly improved.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A test tube preparation device, comprising:
a housing comprising a main cabinet and a lateral cabinet wall movably connected to the main cabinet;
a labeling device disposed in the main cabinet, wherein the labeling device comprising:
a linking module comprising a main frame and a linking unit disposed in the main frame, wherein the linking unit comprises a following frame movable with respect to the main frame; and
a positioning unit disposed on the following frame for receiving a tube body;
a surface treating device comprising a label generating module and a paper supply module configured to supply paper for the label generating module, wherein the label generating module transfers the generated paper to the labeling device, and the positioning unit provides fine adjustment of the position of the tube body relative to the surface treating device; and
a control device configured to control the labeling device and the surface treating device, wherein the positioning unit finely adjusts the position of the tube body to move the tube body to approach or depart from the label generating module, whereby the tube body is labeled and transferred, wherein an auxiliary unit is disposed at one side of the main frame, the linking unit is disposed within the main frame and comprises an active roller unit and a following roller unit, the following roller unit comprises the following frame, the following roller unit is moved by the active roller unit so that the following frame is rotated relative to the main frame, and the positioning unit moves to approach or depart from the auxiliary unit.

2. The test tube preparation device as claimed in claim 1, wherein the auxiliary unit of the linking module comprises a rotational roller and an opening formed above the rotational roller, the active roller unit comprises an active roller and a power portion driving the active roller, the following roller unit comprises a first following roller and a second following roller, and the first following roller is configured to be rotated by the active roller so as to move the following frame.

3. The test tube preparation device as claimed in claim 2, wherein the main frame of the linking module comprises a first lateral frame wall, a second lateral frame wall and a rear lateral frame wall connecting the first lateral frame wall and the second lateral frame wall, the auxiliary unit is disposed on the first lateral frame wall so that two opposite sides of the auxiliary unit correspond to the positioning unit and the label generating module respectively, and an accommodating space is formed between the following frame and the auxiliary unit.

4. The test tube preparation device as claimed in claim 3, wherein the positioning unit comprises a test tube rack and a counter weight member pivoted to the following frame, and the following frame returns to an original position through the counter weight member.

5. The test tube preparation device as claimed in claim 4, wherein the main frame of the linking module comprises a front lateral frame wall, a biasing/guiding unit is disposed on an inner wall of the front lateral frame wall and located above the auxiliary unit.

6. The test tube preparation device as claimed in claim 3, wherein the labeling device comprises a calibrating unit disposed on the second lateral frame wall of the main frame, and the calibrating unit comprises a push member located above the positioning unit and configured to adjust a position of the tube body on the positioning unit.

7. The test tube preparation device as claimed in claim 3, wherein the labeling device comprises a position limiting module disposed on the first lateral frame wall of the main frame and opposite to the positioning unit, the position limiting module comprises an edge detecting unit configured to detect an edge of the tube body for adhesion and align a label with the edge so as to facilitate a labeling operation of detection and alignment of the edge.

8. A test tube preparation device, comprising:
a housing comprising a main cabinet and a lateral cabinet wall movably connected to the main cabinet;
a labeling device disposed in the main cabinet, wherein the labeling device comprising:

a linking module comprising a main frame and a linking unit disposed in the main frame, wherein the linking unit comprises a following frame movable with respect to the main frame; and
a positioning unit disposed on the following frame for receiving a tube body;
a surface treating device comprising a label generating module and a paper supply module configured to supply paper for the label generating module, wherein the label generating module transfers the generated paper to the labeling device, and the positioning unit provides fine adjustment of the position of the tube body relative to the surface treating device; and
a control device configured to control the labeling device and the surface treating device, wherein the positioning unit finely adjusts the position of the tube body to move the tube body to approach or depart from the label generating module, whereby the tube body is labeled and transferred, wherein the housing comprises an upper cover connected to an upper side of the main cabinet, an accommodating unit slidable relative to the lateral cabinet wall protrudes from the lateral cabinet wall, and the accommodating unit is located under the labeling device and corresponds to the positioning unit to receive the tube body falling from the positioning unit.

9. The test tube preparation device as claimed in claim 3, wherein a pivoting portion is disposed under the first lateral frame wall of the main frame and configured to pivot the main frame in the housing so that the main frame is rotated relative to the housing, and the main frame moves to approach or depart from the surface treating device.

10. The test tube preparation device as claimed in claim 3, wherein the labeling device comprises a recognizing module disposed on the first lateral frame wall, and the recognizing module is connected to the control device and configured to recognize a labeling operation on the tube body.

11. The test tube preparation device as claimed in claim 5, wherein the label generating module of the surface treating device comprises a base unit and a printing head unit disposed on the base unit, the base unit comprises a paper feed roller and a peeling unit, and the paper supply module includes a paper roll holder and a collecting unit, the paper roll holder is configured to set the paper so as to supply the paper to the printing head unit for printing, a back paper of the paper is peeled off by the peeling unit, and the paper feed roller conveys an adhesive paper of the paper, and the collecting unit is configured to collect the back paper.

12. The test tube preparation device as claimed in claim 11, wherein the auxiliary unit comprises an opening, the biasing/guiding unit, the opening of the auxiliary unit, and the paper feed roller of the base unit form a paper feeding path configured to guide the adhesive paper so as to facilitate adhesion of the adhesive paper to the tube body.

13. The test tube preparation device as claimed in claim 6, wherein the calibrating unit includes a guiding member disposed on the second lateral frame wall and the push member connected to the guiding member, and the displacement of the guiding member relative to the second lateral frame wall is finely adjusted, whereby the push member is moved, and a position of the tube body on the positioning unit is correctly adjusted.

14. A preparation method for a test tube, applying the test tube preparation device as claimed in claim 1, the preparation method comprising:
a generating step: receiving an instruction and data through the label generating module of the surface treating device and receiving paper from the paper feeding module so as to generate a data label on the paper;
a conveying step: conveying the paper with the data label to the labeling device through the label generating module;
a labeling step: feeding the tube body into the positioning unit through the labeling device, controlling the linkage relationship of the linking unit of the linking module through the control device so that the following frame finely adjusts the displacement of the positioning unit, and further finely adjusts a position of the tube body to approach the label generating module, so that the paper with the data label is adhered to the tube body,
wherein in the generating step, the label generating module of the surface treating device receives the instruction from a data device and the data associated with a patient, and receives the paper from the paper supply module, and supplies the paper to a printing head unit of the label generating module to print the data on an adhesive paper of the paper,
wherein in the generating step, the label generating module of the surface treating device and the paper supply module may be disposed in the housing, and the label generating module is disposed opposite to the labeling device.

15. The preparation method as claimed in claim 8, wherein in the generating step, the label generating module of the surface treating device is disposed outside the housing, and the label generating module utilizes a printer to print the data associate with a plurality of patients to the adhesive papers on a roll of paper so as to generate the labels one by one, and placing the paper roll on a paper roll holder of the paper supply module, in the conveying step: using a paper feed roller of the base unit of the label generating module to receive and convey the paper, and then peeling off a back paper of the paper through a peeling unit, and the paper feed roller conveys the adhesive paper to the labeling device, and collecting the back paper with the collecting unit of the paper supply module.

16. A preparation method for a test tube, applying the test tube preparation device as claimed in claim 1, the preparation method comprising:
a generating step: receiving an instruction and data through the label generating module of the surface treating device and receiving paper from the paper feeding module so as to generate a data label on the paper;
a conveying step: conveying the paper with the data label to the labeling device through the label generating module;
a labeling step: feeding the tube body into the positioning unit through the labeling device, controlling the linkage relationship of the linking unit of the linking module through the control device so that the following frame finely adjusts the displacement of the positioning unit, and further finely adjusts a position of the tube body to approach the label generating module, so that the paper with the data label is adhered to the tube body; and
a correlating step before the generating step: turning on a power source, before said device is used to prepare the label, and the tube body collects the biological product to be analyzed, said device is connected to the data device through which the patient's identity is identified and the relevant personal data and biometric data of the patient are correlated.

17. The preparation method as claimed in claim 14, wherein in the conveying step, the paper feed roller of the base unit of the label generating module receives the paper, and the back paper of the paper is peeled off by the peeling unit, and the adhesive paper is conveyed by the paper feed roller of the base unit of the label generating module to the labeling device, and the collecting unit of the paper supply module is configured to collect the back paper, and the adhesive paper passes through an opening of an auxiliary unit of the linking module, enters the main frame, and is guided by the biasing/guiding unit of the linking module, whereby the adhesive paper is conveyed toward the tube body; in the labeling step, the tube body is rotated by a rotational roller through a fine adjustment of the position of the positioning unit so that the adhesive paper can be adhered to the tube body.

18. The preparation method as claimed in claim 17, further comprising a detecting step after the labeling step, the edge finding unit of the position limiting module of the labeling device is used for aligning the tube body to facilitate the labeling of the tube body; and a completion step: after the labeling step, the linking unit of the labeling devices controlled to release the linking relationship temporarily by the control device, so that the positioning unit on the following frame moves the test tube rack back through the weight member, the labeled tube body is dropped into the accommodating unit on an inner surface of the lateral cabinet wall from the test tube rack.

\* \* \* \* \*